United States Patent
Chhillar et al.

(10) Patent No.: US 11,342,988 B2
(45) Date of Patent: May 24, 2022

(54) SPECTRUM COORDINATION IN OPTICAL LINE PROTECTION TO MINIMIZE OPTICAL TRANSCEIVER RETUNING

(71) Applicant: Ciena Corporation, Hanover, MD (US)

(72) Inventors: Mohit Chhillar, Delhi (IN); Seemant Bisht, New Delhi (IN); Rishi Malik, New Delhi (IN); Parmita Kandiyal, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/010,896

(22) Filed: Sep. 3, 2020

(65) Prior Publication Data

US 2022/0029701 A1    Jan. 27, 2022

(30) Foreign Application Priority Data

Jul. 22, 2020  (IN) .............................. 202011031409

(51) Int. Cl.
| | | |
|---|---|---|
| *H04B 10/032* | (2013.01) | |
| *H04J 14/02* | (2006.01) | |
| *H04B 10/572* | (2013.01) | |
| *H04B 10/03* | (2013.01) | |
| *H04B 10/40* | (2013.01) | |

(52) U.S. Cl.
CPC ........... *H04B 10/03* (2013.01); *H04B 10/032* (2013.01); *H04B 10/40* (2013.01); *H04B 10/572* (2013.01); *H04J 14/0257* (2013.01); *H04J 14/0267* (2013.01); *H04J 14/0289* (2013.01); *H04J 14/0293* (2013.01)

(58) Field of Classification Search
CPC .......... H04B 10/03–038; H04J 14/0257; H04J 14/0267–0271; H04J 14/0287–0297
USPC ........................................................ 398/1–8
See application file for complete search history.

(56) References Cited

U.S. PATENT DOCUMENTS

| | | |
|---|---|---|
| 8,682,160 B2 | 3/2014 | Prakash et al. |
| 8,818,198 B2 | 8/2014 | Trnkus et al. |
| 8,854,955 B2 | 10/2014 | Prakash et al. |
| 9,054,831 B2 | 6/2015 | Prakash et al. |
| 9,060,215 B2 | 6/2015 | Miedema |
| 9,236,953 B2 | 1/2016 | Chhillar et al. |
| 9,407,359 B2 | 8/2016 | Swinkels et al. |
| 9,485,550 B2 | 11/2016 | Chhillar et al. |
| 9,628,172 B2 | 4/2017 | Prakash et al. |
| 10,097,306 B1 | 10/2018 | Chhillar et al. |
| 10,110,438 B2 | 10/2018 | Prakash et al. |

(Continued)

*Primary Examiner* — Li Liu
(74) *Attorney, Agent, or Firm* — Clements Bernard Baratta; Lawrence A. Baratta, Jr.; Christopher L. Bernard (57) ABSTRACT

Systems and methods include, responsive to a fault affecting an optical service on an active path in an optical network operating at a frequency µ1 via an optical transceiver and having optical line protection via an optical protection switch, switching to an inactive path that now becomes the active path and finding a new route in the optical network for the inactive path that has the fault; responsive to being unable to find a route at the frequency µ1, switching the inactive path to a new route at a different frequency µ2; and implementing spectrum coordination relative to the inactive path to either determine the frequency µ1 is available on the new route or to find another new route for the inactive path where the frequency µ1 is available.

17 Claims, 6 Drawing Sheets

(56) References Cited

U.S. PATENT DOCUMENTS

| | | | |
|---|---|---|---|
| 10,187,144 B2 | 1/2019 | Prakash et al. | |
| 10,411,806 B2 | 9/2019 | Prakash et al. | |
| 2002/0191247 A1* | 12/2002 | Lu | H04B 10/03 398/79 |
| 2003/0039433 A1* | 2/2003 | Eng | H04J 14/0241 385/24 |
| 2006/0039696 A1* | 2/2006 | Saniee | H04J 14/0269 398/3 |
| 2010/0189442 A1* | 7/2010 | Grobe | H04J 14/0297 398/79 |
| 2011/0274425 A1* | 11/2011 | Grobe | H04J 14/0283 398/3 |
| 2014/0348504 A1* | 11/2014 | Blair | H04J 14/025 398/49 |
| 2015/0086202 A1 | 3/2015 | Prakash et al. | |
| 2015/0244470 A1* | 8/2015 | Chhillar | H04B 10/70 398/5 |
| 2015/0280854 A1* | 10/2015 | Matsukawa | H04J 14/0273 398/3 |
| 2016/0037239 A1* | 2/2016 | Chhillar | H04J 14/0227 398/49 |
| 2017/0122812 A1* | 5/2017 | Bhatnagar | G01J 3/50 |
| 2017/0302370 A1* | 10/2017 | Fujisawa | H04J 14/0267 |
| 2018/0076882 A1 | 3/2018 | Prakash et al. | |
| 2020/0036439 A1 | 1/2020 | Chhillar et al. | |
| 2020/0137468 A1* | 4/2020 | Schimpe | H04B 10/032 |

\* cited by examiner

SPECTRUM COORDINATION IN OPTICAL LINE PROTECTION TO MINIMIZE OPTICAL TRANSCEIVER RETUNING

FIELD OF THE DISCLOSURE

The present disclosure generally relates to optical networking. More particularly, the present disclosure relates to systems and methods for spectrum coordination of optical transceivers (or transponders, modems, etc.) in an optical line protection scheme to minimize optical transceiver retuning.

BACKGROUND OF THE DISCLOSURE

In optical networks, optical line protection provides working and protect lines (can also be referred to as legs, connections, etc.) in the case of a fault, fiber cut, etc. For example, optical line protection can be referred to as 1+1 protection. Further, as the baud rates increase, optical networks are supporting single channels of up to 800 Gb/s or more per optical transceiver. As described herein, an optical transceiver is a module that transmits and receives a channel over the optical network. Other terms for the optical transceiver include optical modems, transponders, etc., and the present disclosure utilizes the term optical transceiver for all. Note, these high baud rate, coherent optical transceivers are expensive (in terms of hardware and operating costs). In one embodiment, the optical line protection can include redundant optical transceivers—one for the working and one for the protect lines. This configuration protects against line faults and equipment faults at Optical Add/Drop Multiplexer (OADM) nodes. However, the vast majority of faults are line faults instead of equipment faults.

Further, equipment faults can be proactively managed, e.g., a hardware module may show degradation over time. A line fault, on the other hand, is typically unforeseen, e.g., a fiber cut. As such, and based on the fact the optical transceivers are expensive, another optical line protection includes an Optical Protection Switch (OPS), where one optical transceiver is used and sent over two different lines—working and protect lines. This protects against line faults but not equipment faults, at a significantly reduced cost. However, one limitation of optical line protection with a single optical transceiver is that the working and protect lines must have the same optical spectrum used. Here, whatever optical spectrum is being used by the active line, must also be used on the standby line. Note, one of the working and protect lines is active at any given time while the other is inactive.

While optical line protection has its advantages, the spectrum requirement may cause problems if the spectrum is not available on either line. As such, there may be a requirement to retune when switching. The objective of optical line protection is fast, efficient switching such as less than 50 milliseconds. Retuning an optical transceiver, i.e., switching the optical spectrum, can take much longer, such as on the order of tens of seconds or minutes.

BRIEF SUMMARY OF THE DISCLOSURE

The present disclosure relates to systems and methods for spectrum coordination of optical transceivers (or transponders, modems, etc.) in an optical line protection scheme in an optical network to minimize optical transceiver retuning. Specifically, the optical network includes a control plane, a management system, and/or a Software-Defined Networking (SDN) controller. The objective of the present disclosure is to manage network resources to prevent optical transceiver retuning due to a protection switch for faster protection switching and traffic restoration.

In an embodiment, a node configured to operate in an optical network includes an optical transceiver configured to operate at a frequency $\mu 1$ to provide an optical service that has optical line protection via an optical protection switch connected to the optical network; wherein, responsive to a fault that affects the optical service on an active path in the optical network, the optical protection switch is configured to switch to an inactive path that now becomes the active path and vice versa, and wherein a new route is found in the optical network for the inactive path that has the fault, wherein, responsive to being unable to find a route at the frequency $\mu 1$, the inactive path is configured to a new route at a different frequency $\mu 2$, and wherein spectrum coordination is implemented relative to the inactive path to either determine the frequency $\mu 1$ is available on the new route or to find another new route for the inactive path where the frequency $\mu 1$ is available.

Responsive to the spectrum coordination being able to find the frequency $\mu 1$, the inactive path can be changed to either the frequency $\mu 1$ on the new route or switched to the another new route where the frequency $\mu 1$ is available. Responsive to being able to find the route at the frequency $\mu 1$, the inactive path can be switched to the route at the frequency $\mu 1$. Responsive to the spectrum coordination being unable to find the frequency $\mu 1$ available on the new route or to find another new route for the inactive path where the frequency $\mu 1$ is available, the inactive path of the new route can be maintained at the different frequency $\mu 2$. The spectrum coordination can periodically continue while the inactive path is on the new route at the different frequency $\mu 2$. Responsive to a subsequent need to switch while the inactive path is on the new route at the different frequency $\mu 2$, the inactive path can be switched while retuning the optical transceiver to the different frequency $\mu 2$. The node can further include a multiplexer/demultiplexer connected to the inactive path when on the new route at the different frequency $\mu 2$, wherein ports of the multiplexer/demultiplexer are blocked while at the different frequency $\mu 2$. The optical network can include any of a control plane, a Software Defined Networking (SDN) controller, and a management system, each configured to perform path computation.

In another embodiment, a method includes, responsive to a fault affecting an optical service on an active path in an optical network operating at a frequency $\mu 1$ via an optical transceiver and having optical line protection via an optical protection switch, switching to an inactive path that now becomes the active path and vice versa, and finding a new route in the optical network for the inactive path that has the fault; responsive to being unable to find a route at the frequency $\mu 1$, switching the inactive path to a new route at a different frequency $\mu 2$; and implementing spectrum coordination relative to the inactive path to either determine the frequency $\mu 1$ is available on the new route or to find another new route for the inactive path where the frequency $\mu 1$ is available.

The method can further include, responsive to the spectrum coordination being able to find the frequency $\mu 1$, switching the inactive path to either the frequency $\mu 1$ on the new route or the another new route where the frequency $\mu 1$ is available. The method can further include, responsive to being able to find the route at the frequency $\mu 1$, switching the inactive path to the route at the frequency $\mu 1$. The method can further include, responsive to the spectrum coordination being unable to find the frequency µ1 available on the new route or to find another new route for the inactive path where the frequency µ1 is available, maintaining the inactive path of the new route at the different frequency µ2. The method can further include periodically continuing the spectrum coordination while the inactive path is on the new route at the different frequency µ2. The method can further include, responsive to a subsequent need to switch while the inactive path is on the new route at the different frequency µ2, switching to the inactive path while retuning the optical transceiver to the different frequency µ2. The method can further include blocking a port of a multiplexer/demultiplexer connected to the inactive path when on the new route at the different frequency µ2.

In a further embodiment, an apparatus includes a 1:2 splitter connected to a transmitter of an optical transceiver and configured to output two signals, each configured to operate at a frequency µ1, to an active path and an inactive path in an optical network; a 2×1 switch connected to a receiver of the optical transceiver and configured to output a single output based on two inputs from each of the active path and the inactive path; wherein, responsive to the inactive path having a different frequency µ2, spectrum coordination is implemented relative to the inactive path to either determine the frequency µ1 is available on a new route or to find another new route for the inactive path where the frequency µ1 is available.

Responsive to the spectrum coordination being able to find the frequency µ1, the inactive path can be changed to either the frequency µ1 on the new route or switched to the another new route where the frequency µ1 is available. Responsive to being able to find the route at the frequency µ1, the inactive path can be switched to the route at the frequency µ1. Responsive to the spectrum coordination being unable to find the frequency µ1 available on the new route or to find another new route for the inactive path where the frequency µ1 is available, the inactive path of the new route can be maintained at the different frequency µ2. Responsive to a subsequent need to switch while the inactive path is on the new route at the different frequency µ2, the inactive path can be switched while retuning the optical transceiver to the different frequency µ2.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for spectrum coordination of optical transceivers (or transponders, modems, etc.) in an optical line protection scheme in an optical network to minimize optical transceiver retuning. Specifically, the optical network includes a control plane, a management system, and/or a Software-Defined Networking (SDN) controller. The objective of the present disclosure is to manage network resources to prevent optical transceiver retuning due to a protection switch for faster protection switching and traffic restoration.

Optical Network

Figure 1:
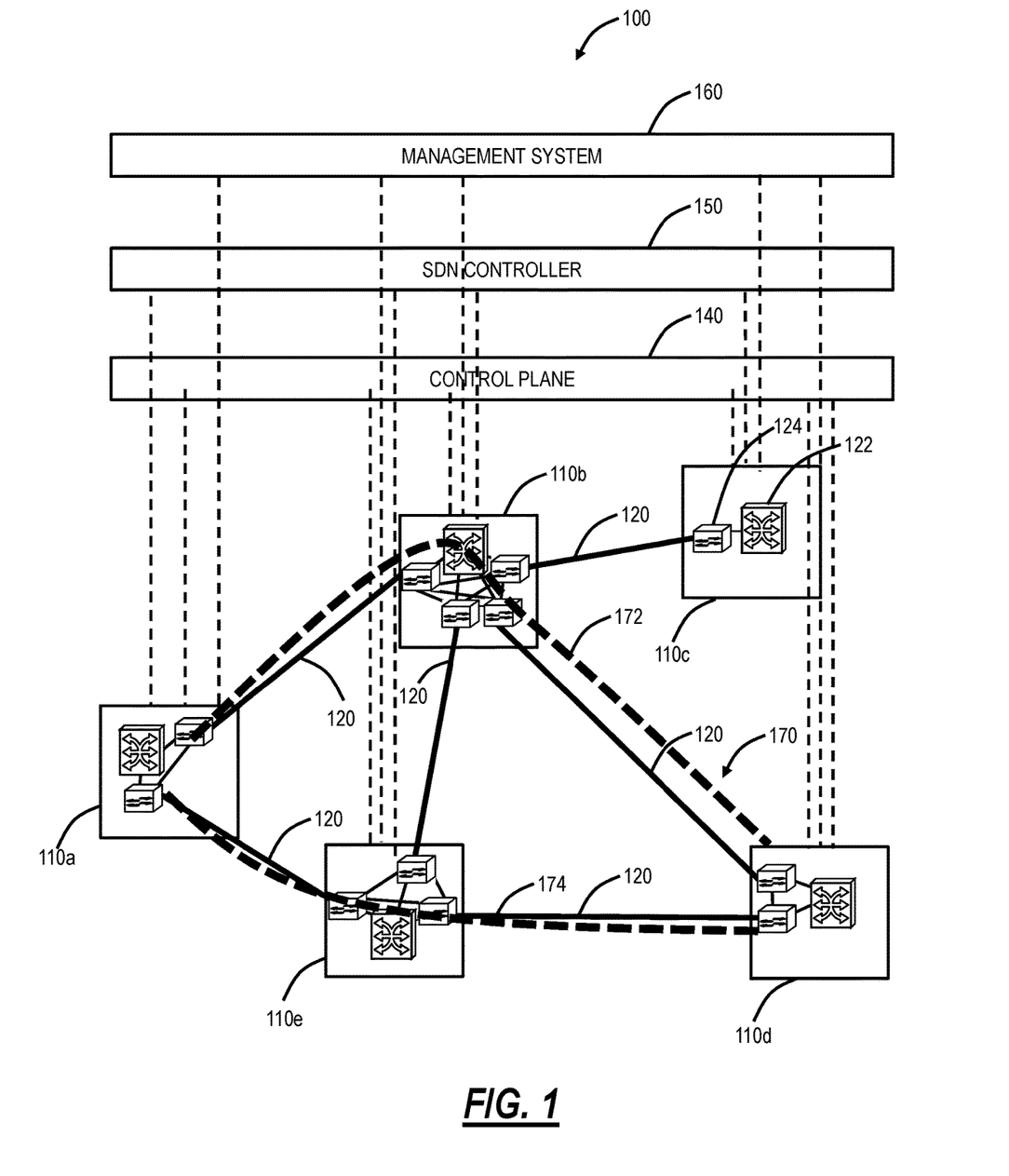
FIG. 1 is a network diagram of an optical network with five interconnected sites.

FIG. 1 is a network diagram of an optical network 100 with five interconnected sites 110a, 110b, 110c, 110d, 110e. The sites 110 are interconnected by a plurality of links 120. Each of the sites 110 can include a switch 122 and one or more WDM network elements 124. The switch 122 is configured to provide services at Layers 1 (e.g., Time Division Multiplexing (TDM), Optical Transport Network (OTN)) and/or Layer 2 (e.g., Ethernet, MPLS) and/or Layer 3 (e.g., IP) where the switch would normally be called a router. The WDM network elements 124 provide the photonic layer (e.g., Layer 0) and various functionality associated therewith (e.g., multiplexing, amplification, optical routing, wavelength conversion/regeneration, local add/drop, etc.) including optical line protection. Of note, while shown separately, those skilled in the art will recognize that the switch 122 and the WDM network elements 124 may be realized in the same network element. For illustration purposes, the switches 122 and the WDM network elements 124 are referred to herein as network elements 122, 124 The photonic layer can also include intermediate amplifiers and/or regenerators on the links 120, which are omitted for illustration purposes. The network 100 is illustrated, for example, as an interconnected mesh network, and those skilled in the art will recognize the network 100 can include other architectures, with additional sites 110 or with fewer nodes sites, with additional network elements and hardware, etc.

The present disclosure focuses on the photonic layer, i.e., Layer 0, and managing optical transceivers at the WDM network elements 124 (or in the switches 122). For illustration purposes, the remainder of this section refers to the network elements 122, 124. In an embodiment, the optical transceivers may be optical transponders or modems in the WDM network elements 124. In another embodiment, the optical transceivers may be line cards or pluggable modules in the switches 122. Those skilled in the art will recognize various implementations are contemplated. The present disclosure focused on the configuration at the photonic layer, independent of the actual hardware implementation. Specifically, while the foregoing description refers to both the network elements 122, 124, those skilled in the art will recognize some embodiments may only include the network elements 122 while other embodiments may only include the network elements 124, whereas some other embodiments may include both.

The sites 110 communicate with one another optically over the links 120. The sites 110 can be network elements, which include a plurality of ingress and egress ports forming the links 120. Further, the sites 110 can include various degrees, i.e., the site 110c is a one-degree node, the sites 110a, 110d are two-degree nodes, the site 110e is a threedegree node, and the site 110*b* is a four-degree node. The number of degrees is indicative of the number of adjacent nodes at each particular node. The network 100 includes a control plane 140 operating on and/or between the network elements 122, 124 at the sites 110*a*, 110*b*, 110*c*, 110*d*, 110*e*. The control plane 140 includes software, processes, algorithms, etc. that control configurable features of the network 100, such as automating the discovery of the network elements 122, 124, the capacity of the links 120, port availability on the network elements 122, 124, connectivity between ports; dissemination of topology and bandwidth information between the network elements 122, 124; calculation and creation of paths for connections; network-level protection and restoration; and the like. In an embodiment, the control plane 140 can utilize Automatically Switched Optical Network (ASON), Optical Signal and Routing Protocol (OSRP), Generalized Multiprotocol Label Switching (GMPLS), or the like. Those of ordinary skill in the art will recognize the optical network 100, and the control plane 140 can utilize any type of control plane for controlling the switches 122 and the WDM network elements 124, and establishing optical connections.

The optical network 100 can also include a Software-Defined Networking (SDN) controller 150. SDN allows the management of network services through abstraction of lower-level functionality. This is done by decoupling the system that makes decisions about where traffic is sent (SDN control through the SDN controller 150) from the underlying systems that forward traffic to the selected destination (i.e., the physical equipment in the optical network 100). Work on SDN calls for the ability to centrally program provisioning of forwarding on the optical network 100 for more flexible and precise control over network resources to support new services. The SDN controller 150 is a processing device that has a global view of the optical network 100. Additionally, the SDN controller 150 can include or connect to SDN applications which can utilize the data from the SDN controller 150 for various purposes.

There are various techniques for data communications between the switches 122, the WDM network elements 124, the control plane 140, the SDN controller 150, and a management system 160 for OAM&P purposes. These various techniques can include one or more of Optical Service Channels (OSCs), overhead communication channels, in-band communication channels, and out-of-band communication channels. OSCs are dedicated wavelengths between WDM network elements 124. The overhead communication channels can be based on SONET, SDH, or OTN overhead, namely the Data Communication Channel (DCC) or General Communication Channel (GCC). The in-band communications channels and the out-of-band communication channels can use various protocols for OAM&P communications in the network 100.

Again, the optical network 100 is presented for illustration purposes as one possible network for use with the inventory management systems and methods described herein. Various types of networks are contemplated, including single-layer networks, single protocol networks, etc. Also, the control plane 140, the SDN controller 150, and the management system 160 may be used together or independently. That is, the optical network 100 can use the control plane 140 separately from the SDN controller 150. Conversely, the optical network 100 can use the SDN controller 150 separately from the control plane 140. Also, the control plane 140 can operate in a hybrid control mode with the SDN controller 150. In this scheme, for example, the SDN controller 150 does not necessarily have a complete view of the optical network 100. Here, the control plane 140 can be used to manage services in conjunction with the SDN controller 150. The SDN controller 150 can work in conjunction with the control plane 140 in the sense that the SDN controller 150 can make the routing decisions and utilize the control plane 140 for signaling thereof.

In the terminology of ASON and OSRP, Subnetwork Connections (SNCs) are end-to-end signaled paths or calls since, from the point of view of a client signal, each is a single network segment. In GMPLS, the connections are an end-to-end path is referred to as a Label Switched Path (LSP). In SDN, such as in OpenFlow, services are called "flows." In the various descriptions herein, the term service is used to refer to an SNC, LSP, flow, etc. Those skilled in the art will recognize that SNCs, LSPs, flows, or any other managed service in the network can be used with the systems and methods described herein for end-to-end paths.

Optical Line Protection

Figure 2:
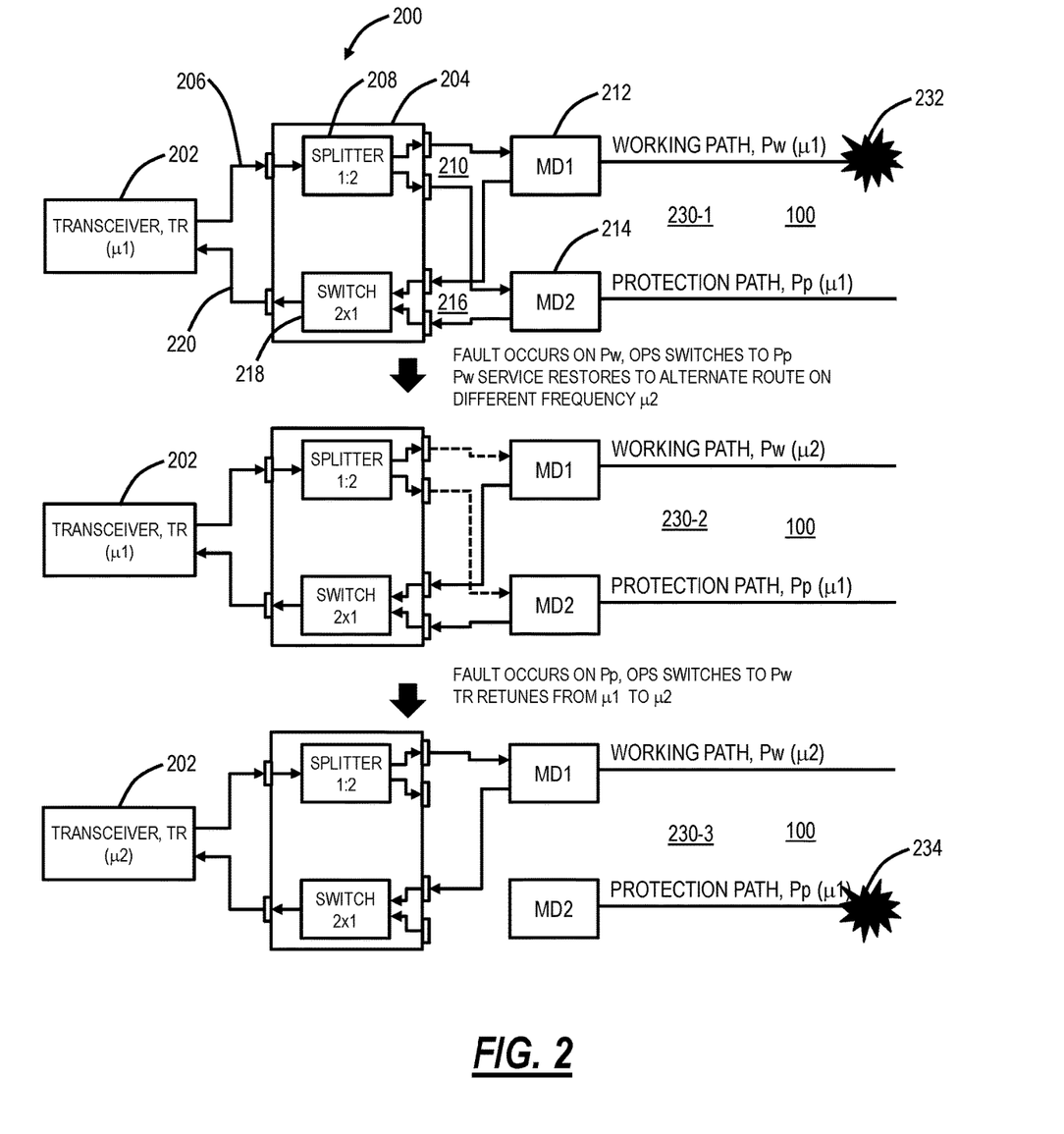
FIG. 2 is a diagram of a network element with an optical transceiver connected to an optical network via an Optical Protection Switch (OPS) providing optical line protection, for illustration of spectrum retuning.

FIG. 2 is a diagram of a network element 200 with an optical transceiver 202 connected to an optical network 100 via an Optical Protection Switch (OPS) 204, providing optical line protection, for illustration of spectrum retuning. For illustration purposes, the optical network 100 includes a service 170 between the sites 110*a*, 110*d* with two lines 172, 174. The network element 200 can be at either of the sites 110*a*, 110*d*. There is a single optical transceiver 202, and the service 170 can be 1+1 protection utilizing the OPS 204. On the transmit side, the OPS 204 receives a transmitted signal 206 from the optical transceiver 202 and splits it with a 1:2 splitter 208 sending identical signals 210 on both a working path Pw and a protection path Pp, which are the lines 172, 174, respectively. The working path Pw includes a multiplexer/demultiplexer 212, and the protection path Pp includes a multiplexer/demultiplexer 214. On the receive side, the OPS 204 receives two signals 216, one each from the working path Pw and the protection path Pp, as inputs to a 2×1 switch 218 and presents only a single output 220 to the optical transceiver 202.

The service 170 can be 1+1 protected, and the OPS 204 can be a Transponder Triggered Optical Line Protection Switch (TT-OPS). Here, the TT-OPS selects the better of the two signals 216 on the receive side and programs the multiplexer/demultiplexer 212, 214 accordingly. The inputs of the signals 216 to the 2×1 switch 218 can be controlled by a port selector that can be software controlled. The multiplexer/demultiplexer 212, 214 can be Wavelength Selective Switches (WSSs) or other types of programmable components that provide an on-ramp/off-ramp to the optical network 100.

Again, a 1+1 service requires two routes in the optical network 100. With the control plane 140, this is achieved through s Subnetwork Connection Protection (SNCP) service. For high resiliency, the two legs of the SNCP (i.e., the lines 172, 174) should try to independently restore based on available resources in the optical network 100, i.e., with the same or different spectrum/frequency. As described herein, spectrum/frequency is referred to as $\mu 1$ or $\mu 2$ and is meant to denote any of a fixed grid wavelength, a portion of the spectrum in a flexible grid system, or the like. There are other characteristics such as spectral width, modulation, chromatic dispersion, link optimization mode, etc. that are dependent on the route chosen.

From a terminology perspective, the term route is used herein to define a set of nodes A-Z in the network between a source and a destination. The term path is used to note an active or inactive path, a working or protection path, etc. That is, the path is a configured route.

The OPS 204 can be a passive device operating photonically. Here, the OPS 204 can switch based on the presence/absence of optical power, and the OPS 204 expects the same frequency on both the legs (when enabled), thereby reducing the resiliency as it restricts two SNCP legs to occupy same frequency. This reduces the choices for the services in the optical network 100, and the service 170 may not be able to redial.

The optical transceiver 202 can also be referred to as a modem, transponder, transmitter/receiver, etc. The optical transceiver 202 is configured to transmit and receive a traffic-bearing signal at a specified spectrum µ. For example, the optical transceiver 202 can be a coherent modem capable of different baud rates, modulation formats, etc. for 100's Gb/s transmission. The optical transceiver 202 can operate on fixed grid wavelengths, flexible ("flex") grid spectrum, etc. The optical transceiver 202 can be tuned across a range of the optical spectrum, such as across the entire C-band (e.g., ~1530 nm-1565 nm). Again, as described herein, the retuning process takes time, 100's of seconds, etc.

FIG. 2 illustrates three steps 230-1, 230-2, 230-3 for illustration of spectrum retuning by the optical transceiver 202 in an optical line protection scenario. Before step 230-1, the optical transceiver 202 is tuned to frequency µ1, and the OPS 204 is configured on the working path Pw. For example, the service 170 is on the line 172 in the optical network 100. In step 230-1, there is a fault 232 on the working path Pw, e.g., a fiber cut, intermediate equipment failure, etc. In step 230-1, both the multiplexer/demultiplexer 212, 214 are programmed to the frequency µ1.

In step 230-2, the OPS 204 switches to the protection path Pp, the transceiver 202 is still tuned to frequency µ1, and the switch 2×1 218 is reconfigured. For example, the service 170 is now on the line 174 in the optical network 100. Also, at step 230-2, the working path Pw is restored in the optical network 100, such as based on mesh restoration, etc., but the restoration is to an alternate route on a different frequency µ2. Here, the multiplexer/demultiplexer 212 is now programmed to the frequency µ2 whereas the multiplexer/demultiplexer 214 remains programmed to the frequency µ1. This is a problem as the optical transceiver 202 is still configured for the frequency µ1, and the OPS 204 can not simply switch back to the working path Pw. That is, the optical transceiver 202 must be on the frequency µ2 to switch back to the working path Pw.

At step 230-3, there is another fault 234 on the protection path Pp. The OPS 204 switches back to the working path Pw, but the optical transceiver 202 requires retuning from the frequency µ1 to the frequency µ2. Again, this process can take several seconds or minutes, whereby the service 170 is down, contrary to the configuration and expectation of the optical line protection.

Spectrum Coordination in Optical Line Protection

The present disclosure addresses the need to retune the optical transceiver 202 in the optical network 100, specifically where the optical network 100 is controlled by any of the control plane 140, the SDN controller 150, and/or the management system 160. The present disclosure includes periodically checking network resources to align the frequency of an inactive leg (line) with that of the active leg (line). When the network resources are available on the inactive leg, at the same frequency as the active leg, these network resources are reserved and/or allocated such that an OPS 204 switch can be accomplished without reprogramming the optical transceiver 202. That is, the present disclosure provides a mechanism to minimize the number of retunes so that the traffic switching time match that of normal OPS 204 switching times. This is achieved by periodically coordinating the spectrum of both working and protection paths Pw, Pp.

Figure 3:
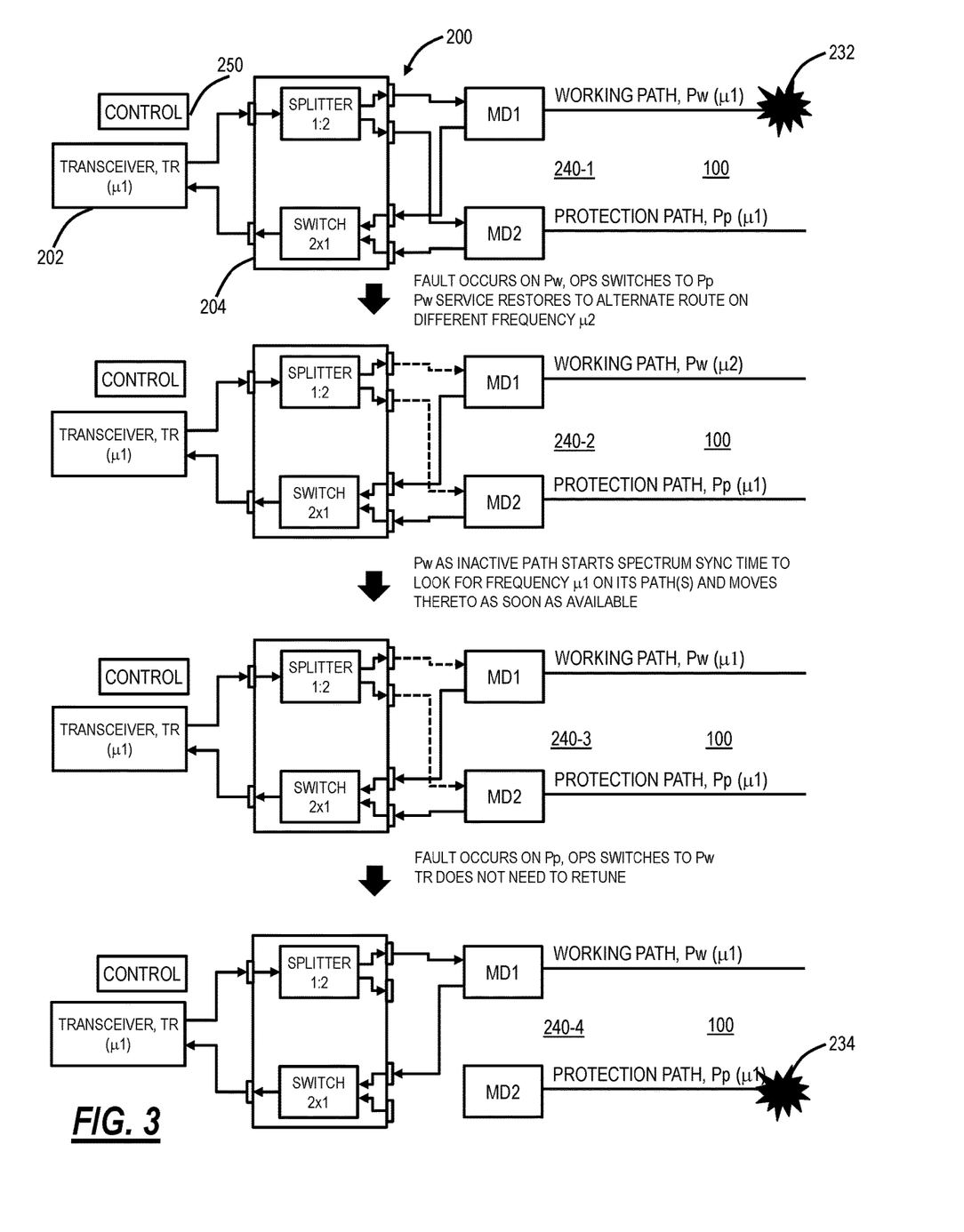
FIG. 3 is a diagram of a network element with an optical transceiver connected to an optical network via an Optical Protection Switch (OPS) providing optical line protection, for illustration of spectrum coordination between the active and inactive paths.

FIG. 3 is a diagram of a network element 200 with an optical transceiver 202 connected to an optical network 100 via an Optical Protection Switch (OPS) 204, providing optical line protection, for illustration of spectrum coordination between the active and inactive paths. The spectrum coordination between the active and inactive paths is illustrated with steps 240-1, 240-2, 240-3, 240-4. FIG. 3 includes the same components as in FIG. 2, with the addition of a controller 250. The controller 250 can perform OAM&P functions, configuration, management, etc. relative to the network element 200. For example, the controller 250 can be a module, a processing device, etc. The controller 250 can be part of the control plane 140, communicate to the SDN controller 150 and/or the management system 160, etc.

At step 240-1, similar to the step 230-1, there is the fault 232 on the working path Pw. Again, at step 240-2, similar to the step 240-2, the OPS 204 switches to the protection path Pp and the working path Pw is restored to an alternate route in the optical network 100 on a different frequency µ2. At step 240-3, spectrum coordination is implemented. Spectrum coordination includes the inactive path (in this case, the working path Pw), maintaining a spectrum synchronization (sync) timer to look for the frequency µ1 for the working path Pw. Here, the frequency µ1 either becomes available on the current path (instead of the frequency µ2) or becomes available on an alternate path (which can be switched to for the working path Pw). That is, the goal is to obtain network resources for the working path Pw that have the same frequency µ1 as the protection path Pp, such that when the OPS 204 is switched back to the working path Pw, there is no need to retune. As illustrated in step 240-4, the fault 234 occurs on the protection path Pp and the OPS 204 switches back to the working path Pw, which now has network resources available for the frequency µ1, not requiring retuning as in the step 230-3.

The spectrum coordination approach brings up services occupying any available network resources and then use the controller 250 to enable/disable light towards the OPS 204, by programming the multiplexer/demultiplexer 212, 214. For example, at step 240-2, the working path Pw is restored, but on a different frequency µ2. Since the optical transceiver 202 is at the frequency µ1, the optical transceiver 202 cannot operate on the working path Pw. As such, the controller 250 can program the multiplexer/demultiplexer 212 to block the different frequency µ2 (by configuring the output ports to be at the frequency µ1).

At step 240-2, the optical transceiver 202 is programmed with the frequency and other modem characteristics (e.g., spectral width, modulation, chromatic dispersion, link optimization mode, etc.) of the active leg, i.e., the protection path Pp. These parameters are path dependent and can change when active leg switches. Note, these parameters can be changed more quickly than retuning the frequency, and these parameters are changed today with optical line protection.

The light toward the optical transceiver 202 from the inactive leg (the protection path Pp in the steps 240-1, 240-4, and the working path Pw in steps 240-2, 240-3) would be restricted by closing ports on the multiplexer/demultiplexer 212, via the controller 250. The control plane 140, the SDN controller 150, and/or the management system 160 has the knowledge to make an informed decision to program the optical transceiver 202 and the multiplexer/demultiplexer 212, 214 and let the right signal to pass.

At step 240-1, after the fault 232 on the working path Pw, the optical transceiver 202 can send a message to the OPS 204 (because the optical transceiver 202 detects loss of light, signal degrade, loss of frame, etc. at the receiver), and the OPS 204 switches to the protection path Pp. Alternatively, the OPS 204 can switch based on its detection of loss of light, signal degrade, loss of frame, etc. Of course, any embodiment of optical line protection switching is contemplated herein.

At step 240-2, if the working path Pw does not find its frequency $\mu 1$ on an alternate route, the working path Pw is restored on a new frequency $\mu 2$ on an alternate route. The controller 250 closes the ports on the multiplexer/demultiplexer 212 for the working path Pw, because of the frequency mismatch.

Note, it is important to restore the working path Pw, and it is sufficient to have it on the alternate path with the different frequency $\mu 2$. This enables protection, albeit requiring retuning should there be a need to switch again. So, at step 240-2, both legs are protected, but a switch from the active path (protection path Pp) to the inactive path (working path Pw) requires a retuning to the frequency $\mu 2$.

At this point, the spectrum coordination process is implemented. The goal is to periodically coordinate the optical spectrum of both working and protection paths to lead to a lesser number of optical transceiver 202 retunes on a next protection switch. Thus, the goal of the spectrum coordination process is to always have an inactive path (even at a different frequency $\mu 2$) and then to attempt to find the same frequency $\mu 1$. In this manner, the service 170 is always protected, and the goal is to avoid retunes. If there is a need to switch before the spectrum coordination process finds the frequency $\mu 1$, retuning occurs. However, if time passes and a new route or if the frequency $\mu 1$ becomes available, those resources are obtained, so the next protection switch does not require a retune.

Spectrum Coordination Process

Figure 4:
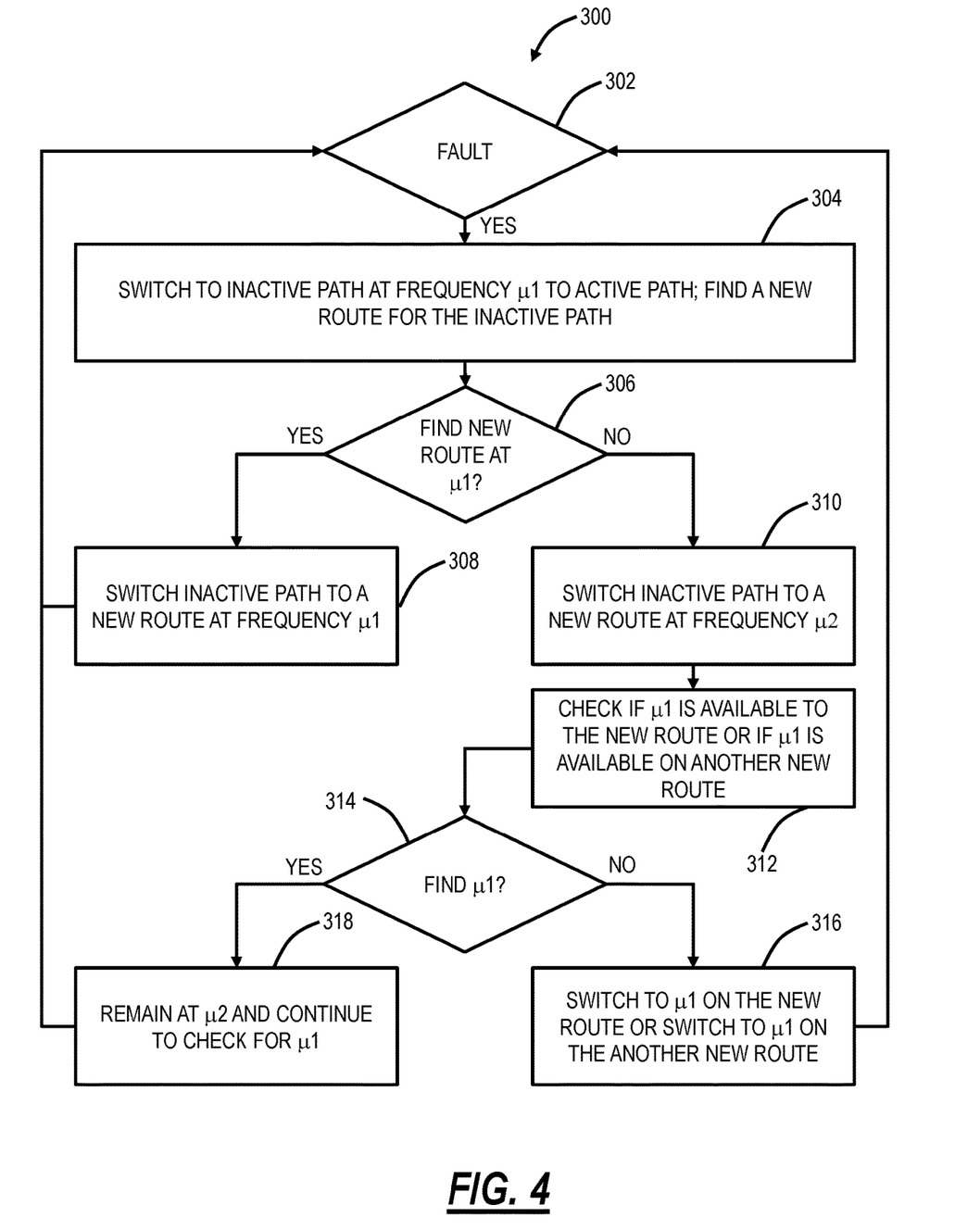
FIG. 4 is a flowchart of a spectrum coordination process for optical line protection to coordinate optical spectrum between active and inactive paths.

FIG. 4 is a flowchart of a spectrum coordination process 300 for optical line protection to coordinate the optical spectrum between the active and inactive path. The spectrum coordination process 300 begins with the optical transceiver 202 operating on an active path at frequency $\mu 1$. Again, the terminology here for describing the spectrum coordination process 300 will use active and inactive path, as opposed to working and protection paths. Those skilled in the art recognize the working path can be active or inactive, where the protection path can be the other of active or inactive.

On a fault (step 302), the active path is switched to the inactive path at the frequency $\mu 1$, and a new route is found for the now inactive path (step 304). The new route can be found using the control plane 140, the SDN controller 150, the management system 160, etc. The process for finding a new route is generally referred to as path computation (step 306). Objectives in path computation include finding a new route at the same frequency $\mu 1$, with appropriate reach, loss, dispersion, etc., and the like.

If a new route is found for the inactive path at the same frequency $\mu 1$ (step 306), then the inactive path is switched to this new route at the same frequency $\mu 1$ (step 308). If the new route is not found (step 306), then the spectrum coordination process 300 includes finding a new route at a different frequency $\mu 2$ and switching thereto (step 310).

Now, the inactive path has been restored, albeit at the different frequency $\mu 2$. Thus, the service is protected, but another switch at this point will require the optical transceiver 202 to retune. While the inactive path is on the new route at the different frequency $\mu 2$, the spectrum coordination process 300 includes checking if the frequency $\mu 1$ is available on this new route or if the frequency $\mu 1$ is available on another new route (step 312). Again, this can include periodic path computation for the another new route as well as periodically checking the route the inactive path is currently on for the availability of the frequency $\mu 1$. The another new route is constrained to have the frequency $\mu 1$.

If the spectrum coordination process 300 finds the frequency $\mu 1$ (step 314), the inactive path is either switch to the frequency $\mu 1$ on the new route (its current route) or the inactive path is switched to another new route at the frequency $\mu 1$ (step 316). If the spectrum coordination process 300 does not find the frequency $\mu 1$ (step 314), the inactive path can remain at the frequency $\mu 2$ as well as continue to check for the frequency $\mu 1$ (step 318). In an embodiment, the checks for frequency $\mu 1$ on the new route and for the another new route can be done periodically based on a spectrum sync timer. For example, set the timer, and check at the expiry of the timer. If available, switch, and if not, reset the timer.

Automatic Transceiver Frequency Retuning

Figure 5:
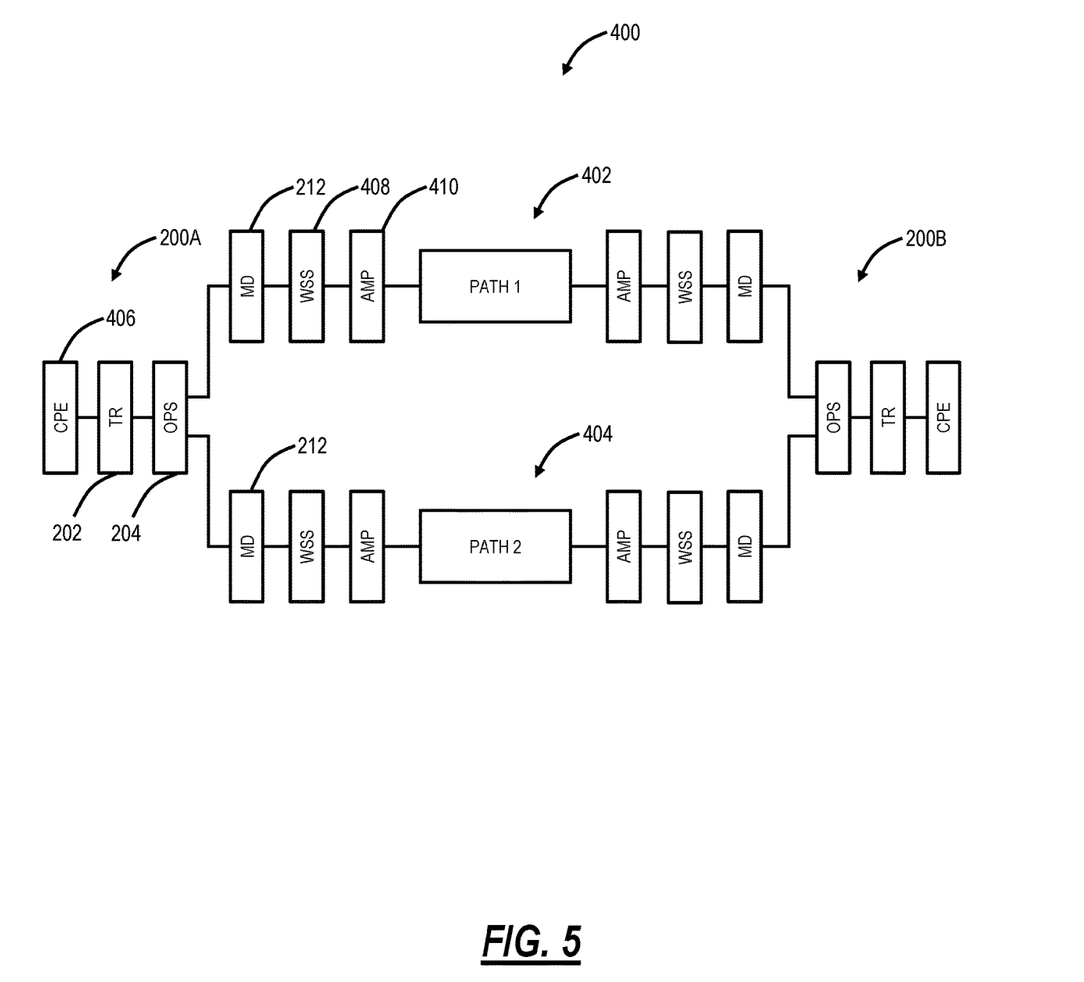
FIG. 5 is a network diagram of a network illustrating two network elements with optical line protection.

FIG. 5 is a network diagram of a network 400 illustrating two network elements 200A, 200B with optical line protection. The network elements 200A, 200B are interconnected by two paths 402, 404, such as the working path Pw and the protection path Pp. The network elements 200A, 200B include a Customer Premises Equipment (CPE) 406 device, connected to the optical transceiver 202, which is connected to the OPS 204. The OPS 204 is connected to the multiplexer/demultiplexer 212, 214, as described herein. Additionally, there can be a WSS 408 and optical amplifier 410.

Usually, in an optical line protection configuration, the multiplexer/demultiplexer 212, 214 is connected to the optical transceiver 202 via the OPS 204 as described herein. The optical transceiver 202 transmitted signal 206 is connected to a common port of the OPS 204, and the multiplexer/demultiplexer 212, 214 ports for the two signals 216 are connected to Switch Ports (SW1 and SW2) of the OPS 204. When a fault occurs on the line in the optical network 100, 400, the OPS 204 can make a switching decision, and, if needed, it switches to the other Switch Port. As described herein, this requires the same frequency or retuning.

There are scenarios where this setup will fail to recover the traffic automatically (without manual intervention). First, when the Layer 0 services come on the same frequency after mesh restoration. Here, the same frequency is configured on both the multiplexer/demultiplexer 212, 214 ports associated with the OPS 204 switch ports. If both the lines go down and L0 keeps on retrying, and the multiplexer/demultiplexer 212, 214 ports are set to a resting frequency $\mu r$ and the optical transceiver 202 is tuned to resting frequency $\mu r$. Then one of the path's 402, 404 (one of the ports on the multiplexer/demultiplexer 212, 214 is) L0 SNC comes up (on the original frequency $\mu 1$). At present, since there will be a mismatch on two multiplexer/demultiplexer 212, 214 ports' frequencies (associated with OPS SW1 and SW2 ports), and the optical transceiver 202 is tuned to resting frequency, traffic will not come up.

Second, the two multiplexer/demultiplexer 212, 214 ports (associated with OPS SW1 and SW2 ports) have a different frequency configured, and the switch 2×1 218 of the OPS 204 is on the port which has different frequency configured than the frequency the optical transceiver 202 is tuned to. Again, this problem is as described above. After the mesh restoration, one of the legs comes up on different frequency than the optical transceiver 202. This may happen when a user does not set explicit frequencies or where there is not a possible route with the same frequency.

Whenever there is such a scenario, when two different Frequencies/Wavelengths are provisioned on the multiplexer/demultiplexer 212, 214 ports connected to switch ports of the OPS 204, if there is a fault in the optical network 100 on the active path, the OPS 204 gets Loss of Signal (LOS) on both paths (one path has LOS because of the fault, and the other path has LOS because the optical transceiver is still tuned to a different frequency). In an embodiment, the OPS 204 can generate a trigger after a designated/soak time, indicating both switch ports have LOS. This trigger can be used to trigger to the optical transceiver 202 for retuning to the alternate frequency.

After waiting for a certain amount of time (which may be related to L0 SNC mesh restoration time and other related factors), the OPS 204 can generate a trigger (call it SWITCH_PORTS_DOWN) that both switch ports are in LOS for a certain period to start a timer T2 (explained below, why this T2 is needed). An application on this trigger, can check if the associated multiplexer/demultiplexer 212, 214 ports have the same or different frequency configuration. If the frequencies are different, the optical transceiver 202 can be configured to retune to the other (non-Active) frequency.

After retuning to the alternate frequency is complete (this process will happen on both ends), the LOS will be cleared on the OPS ports connected with multiplexer/demultiplexer 212, 214 ports configured with alternate frequency (on both ends).

The T2 timer (running on the OPS 204) is related to the optical transceiver 202 retuning time. It must be more than the optical transceiver 202 retuning time (also considering that both the ends of the SNC will go for retuning). Even after the expiry of T2 timer, if LOS on both the ports exists, OPS can regenerate the trigger (SWITCH_PORTS_DOWN) that it is still getting LOS. This can again be used for the optical transceiver 202 retuning to the other frequency.

This retuning can be stopped: 1) after a certain number of retries (the assumption is when reties are over, the optical transceiver 202 will be tuned to original frequency), 2) by user intervention, or 3) with just one try (a special case of 1).

Spectrum Coordination Process

Figure 6:
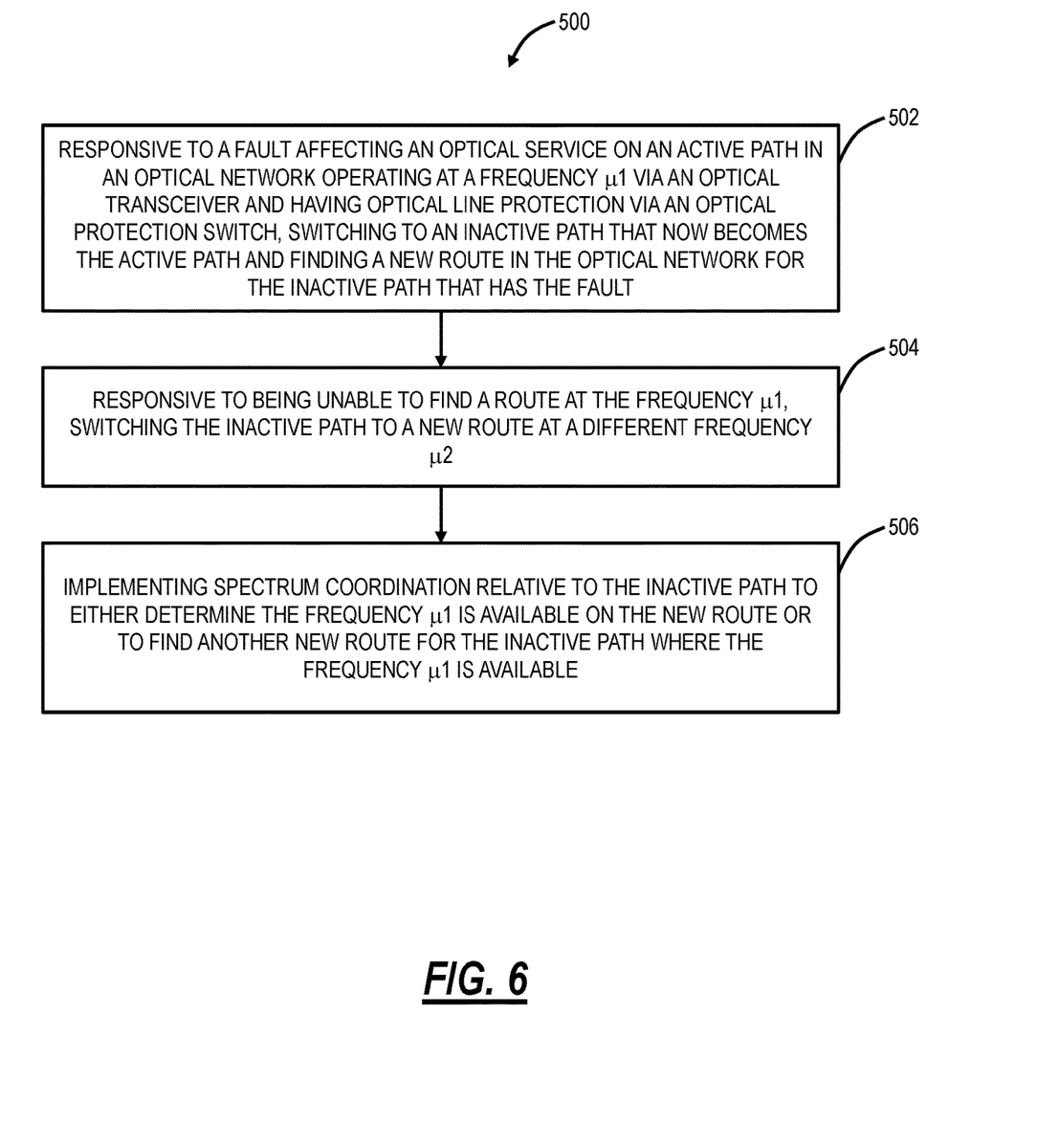
FIG. 6 is a flowchart of a spectrum coordination process.

FIG. 6 is a flowchart of a spectrum coordination process 500. The spectrum coordination process 500 includes, responsive to a fault affecting an optical service on an active path in an optical network operating at a frequency μ1 via an optical transceiver and having optical line protection via an optical protection switch, switching to an inactive path that now becomes the active path and finding a new route in the optical network for the inactive path that has the fault (step 502); responsive to being unable to find a route at the frequency μ1, switching the inactive path to a new route at a different frequency μ2 (step 504); and implementing spectrum coordination relative to the inactive path to either determine the frequency μ1 is available on the new route or to find another new route for the inactive path where the frequency μ1 is available (step 506).

The spectrum coordination process 500 can further include, responsive to the spectrum coordination being able to find the frequency μ1, switching the inactive path to either the frequency μ1 on the new route or the another new route where the frequency μ1 is available. The spectrum coordination process 500 can further include, responsive to being able to find the route at the frequency μ1, switching the inactive path to the route at the frequency μ1. The spectrum coordination process 500 can further include, responsive to the spectrum coordination being unable to find the frequency μ1 available on the new route or to find another new route for the inactive path where the frequency μ1 is available, maintaining the inactive path of the new route at the different frequency μ2. The spectrum coordination process 500 can further include periodically continuing the spectrum coordination while the inactive path is on the new route at the different frequency μ2.

The spectrum coordination process 500 can further include, responsive to a subsequent need to switch while the inactive path is on the new route at the different frequency μ2, switching to the inactive path while retuning the optical transceiver to the different frequency μ2. The spectrum coordination process 500 can further include blocking a port of a multiplexer/demultiplexer connected to the inactive path when on the new route at the different frequency μ2.

In another embodiment, a node 200 configured to operate in an optical network 100 includes an optical transceiver 202 operating at a frequency μ1 providing an optical service 170 that has optical line protection via an optical protection switch 204 connected to the optical network 100; wherein, responsive to a fault 232 affecting the optical service 170 on an active path in the optical network 100, the optical protection switch 204 is configured to switch to an inactive path that now becomes the active path, and wherein a new route is found in the optical network 100 for the inactive path that has the fault 232, wherein, responsive to being unable to find a route at the frequency μ1, the optical network 100 configures the inactive path to a new route at a different frequency μ2, and wherein spectrum coordination is implemented relative to the inactive path to either determine the frequency μ1 is available on the new route or to find another new route for the inactive path where the frequency μ1 is available.

In a further embodiment, an optical protection switch 204 includes a 1:2 splitter 208 connected to a transmitter of an optical transceiver 202 and configured to output two signals 210, operating at a frequency μ1, to an active path and an inactive path in an optical network 100; a 2×1 switch 218 connected to a receiver of the optical transceiver 202 and configured to output a single output 220 based on two inputs 216 from each of the active path and the inactive path; wherein, responsive to the inactive path operating at a different frequency μ2, spectrum coordination is periodically implemented relative to the inactive path to either determine the frequency μ1 is available on a new route or to find another new route for the inactive path where the frequency μ1 is available.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A node configured to operate in an optical network, the node comprising:
an optical transceiver configured to operate at a frequency $\mu1$ to provide an optical service that has optical line protection via an optical protection switch connected to the optical network;
wherein, responsive to a fault that affects the optical service on an active path in the optical network, the optical protection switch is configured to switch to an inactive path that now becomes the active path and vice versa, and wherein an alternate route at the frequency $\mu1$ is searched for in the optical network to be used for the inactive path that has the fault,
wherein, responsive to being unable to find the alternate route at the frequency $\mu1$, the inactive path is configured to a new route at a different frequency $\mu2$, and
wherein spectrum coordination is implemented relative to the inactive path to determine if the frequency $\mu1$ is available on one of the new route and another new route for the inactive path, and in response to the frequency $\mu1$ being available on the one of the new route and the another new route, switching the inactive path to the one of the new route and the another new route.

2. The node of claim 1, wherein, responsive to being able to find the new route at the frequency $\mu1$, the inactive path is switched to the new route at the frequency $\mu1$.

3. The node of claim 1, wherein, responsive to the spectrum coordination being unable to find the frequency $\mu1$ available on the new route or to find another new route for the inactive path where the frequency $\mu1$ is available, the inactive path is maintained on the new route at the different frequency $\mu2$.

4. The node of claim 3, wherein, the spectrum coordination periodically continues while the inactive path is on the new route at the different frequency $\mu2$.

5. The node of claim 1, wherein, responsive to a subsequent need to switch while the inactive path is on the new route at the different frequency $\mu2$, the inactive path is switched to the active path while retuning the optical transceiver to the different frequency $\mu2$.

6. The node of claim 1, further comprising
a multiplexer/demultiplexer connected to the inactive path when on the new route at the different frequency $\mu2$, wherein ports of the multiplexer/demultiplexer are blocked while at the different frequency $\mu2$.

7. The node of claim 1, wherein the optical network includes any of a control plane, a Software Defined Networking (SDN) controller, and a management system, each configured to perform path computation.

8. A method comprising:
responsive to a fault affecting an optical service on an active path in an optical network operating at a frequency $\mu1$ via an optical transceiver and having optical line protection via an optical protection switch, switching to an inactive path that now becomes the active path and vice versa, and finding an alternate route in the optical network for the inactive path that has the fault;
responsive to being unable to find the alternate route at the frequency $\mu1$, switching the inactive path to a new route at a different frequency $\mu2$; and
implementing spectrum coordination relative to the inactive path to determine if the frequency $\mu1$ is available on one of the new route and another new route for the inactive path, and in response to the frequency $\mu1$ being available on the one of the new route and the another new route, switching the inactive path to the one of the new route and the another new route.

9. The method of claim 8, further comprising
responsive to being able to find the new route at the frequency $\mu1$, switching the inactive path to the new route at the frequency $\mu1$.

10. The method of claim 8, further comprising
responsive to the spectrum coordination being unable to find the frequency $\mu1$ available on the new route or to find another new route for the inactive path where the frequency $\mu1$ is available, maintaining the inactive path on the new route at the different frequency $\mu2$.

11. The method of claim 10, further comprising
periodically continuing the spectrum coordination while the inactive path is on the new route at the different frequency $\mu2$.

12. The method of claim 8, further comprising
responsive to a subsequent need to switch while the inactive path is on the new route at the different frequency $\mu2$, switching the inactive path to the active path while retuning the optical transceiver to the different frequency $\mu2$.

13. The method of claim 8, further comprising
blocking a port of a multiplexer/demultiplexer connected to the inactive path when on the new route at the different frequency $\mu2$.

14. An apparatus comprising:
a 1:2 splitter connected to a transmitter of an optical transceiver and configured to output two signals, each configured to operate at a frequency $\mu1$, to an active path and an inactive path in an optical network;
a 2×1 switch connected to a receiver of the optical transceiver and configured to output a single output based on two inputs from each of the active path and the inactive path;

wherein, responsive to a fault on the active path, the apparatus is configured to switch to the inactive path that now becomes the active path and vice versa, and wherein, responsive to the inactive path having a different frequency µ2 and a requirement to find an alternative route for the inactive path with the different frequency, spectrum coordination is implemented relative to the inactive path to determine if the frequency µ1 is available on one of a new route and another new route for the inactive path, and in response to the frequency µ1 being available on the one of the new route and the another new route, switching the inactive path to the one of the new route and the another new route.

15. The apparatus of claim 14, wherein, responsive to being able to find the new route at the frequency µ1, the inactive path is switched to the new route at the frequency µ1.

16. The apparatus of claim 14, wherein, responsive to the spectrum coordination being unable to find the frequency µ1 available on the new route or to find another new route for the inactive path where the frequency µ1 is available, the inactive path is maintained on the new route at the different frequency µ2.

17. The apparatus of claim 14, wherein, responsive to a subsequent need to switch while the inactive path is on the new route at the different frequency µ2, the inactive path is switched to the active path while retuning the optical transceiver to the different frequency µ2.

* * * * *